US007742607B2

(12) United States Patent
Karjalainen et al.

(10) Patent No.: US 7,742,607 B2
(45) Date of Patent: Jun. 22, 2010

(54) METHOD FOR DESIGNING A MODAL EQUALIZER FOR A LOW FREQUENCY SOUND REPRODUCTION

(75) Inventors: Matti Karjalainen, Espoo (FI); Aki Mäkivirta, Lapinlahti (FI); Poju Antsalo, Helsinki (FI); Vesa Välimäki, Espoo (FI)

(73) Assignee: Genelec Oy, Iisalmi (FI)

( * ) Notice: Subject to any disclaimer, the term of this patent is extended or adjusted under 35 U.S.C. 154(b) by 0 days.

(21) Appl. No.: 10/293,600

(22) Filed: Nov. 14, 2002

(65) Prior Publication Data

US 2003/0099365 A1 May 29, 2003

(30) Foreign Application Priority Data

Nov. 26, 2001 (FI) ................................ 20012313

(51) Int. Cl.
*H04B 3/20* (2006.01)
*H04B 15/00* (2006.01)

(52) U.S. Cl. ........................................ 381/66; 381/93

(58) Field of Classification Search .................. 381/56, 381/58, 59, 61, 98, 101, 103, 66, 93, 63, 381/97; 379/406.01, 406.08
See application file for complete search history.

(56) References Cited

U.S. PATENT DOCUMENTS 4,947,360 A 8/1990 Dyer
5,226,057 A 7/1993 Boren
5,263,019 A * 11/1993 Chu ............................ 381/83
5,325,204 A 6/1994 Scarpa
5,400,084 A 3/1995 Scarpa
5,491,754 A * 2/1996 Jot et al. ....................... 381/63
5,559,891 A 9/1996 Kuusama et al.
5,815,580 A 9/1998 Craven et al.
5,949,894 A 9/1999 Nelson et al.

FOREIGN PATENT DOCUMENTS

| | | | |
|---|---|---|---|
| EP | 0 505 949 | A1 | 9/1992 |
| EP | 0 535 737 | B1 | 6/1997 |
| EP | 1 017 166 | A2 | 7/2000 |
| JP | 1130608 | A | 5/1989 |

(Continued)

OTHER PUBLICATIONS

Aki Makivirta et al, "Low-Frequency Modal Equalization of Loudspeaker-Room Responses", AES 111th Convention, New York Sep. 21-24, 2001, p. 1-9.*

(Continued)

*Primary Examiner*—Ping Lee
(74) *Attorney, Agent, or Firm*—Birch Stewart Kolasch & Birch, LLP

(57) ABSTRACT

In a room with strong low-frequency modes the control of excessively long decays is problematic or impossible with conventional passive means. In this patent application a systematic methodology is presented for active modal equalization able to correct the modal decay behaviour of a loudspeaker-room system. Two methods of modal equalization are proposed. The first method modifies the primary sound such that modal decays are controlled. The second method uses separate primary and secondary radiators and controls modal decays with sound fed into at least one secondary radiator. Case studies of the first method of implementation are presented.

19 Claims, 7 Drawing Sheets

FOREIGN PATENT DOCUMENTS

| | | |
|---|---|---|
| JP | 02142300 | 5/1990 |
| JP | 02150197 | 6/1990 |
| JP | 03106208 | 5/1991 |
| JP | 04194996 | 7/1992 |
| JP | 11262095 | 9/1999 |

OTHER PUBLICATIONS

Karjalainen et al, "Estimation of Model Decay Parameters from Noisy Response Measurements", AES 110th Convention, Amsterdam, The Netherlands, May 12-15, 2001.*

"Estimation of Modal Decay Parameters from Noisy Response Measurements," M. Karjalainen et al., presented at the AES $110^{th}$ Convention, Amsterdam, The Netherlands, May 12-15, 2001.

S.J. Elliott et al., "*Multi-Point Equalization in a Room Using Adaptive Digital Filters*," Journal of the Audio Engineering Society, Audio Engineering Society, New York, U.S., vol. 37, No. 11, Nov. 1, 1989, pp. 899-907, XP000142129. ISSN: 0004-7554.

J. Proakis et al., "*Digital Signal Processing*," 1989, McMillan Publishing Company, New York, XP002322985, pp. 172-175.

J. Mourjopoulos et al., "*Pole and Zero Modeling of Room Transfer Functions*," Journal of Sound and Vibration, vol. 146(2), Apr. 22, 1991, XP002322984.

* cited by examiner

METHOD FOR DESIGNING A MODAL EQUALIZER FOR A LOW FREQUENCY SOUND REPRODUCTION

The embodiments of the invention relates to a method for designing a modal equalizer for a low audio frequency range.

Traditional magnitude equalization attempts to achieve a flat frequency response at the listening location either for the steady state or early arriving sound. Both approaches achieve an improvement in audio quality for poor loudspeaker-room systems, but colorations of the reverberant sound field cannot be handled with traditional magnitude equalization. Colorations in the reverberant sound field produced by room modes deteriorate sound clarity and definition.

U.S. Pat. No. 5,815,580 describes this kind of compensating filters for correcting amplitude response of a room.

M. Karjalainen, P. Antsalo, A. Mäkivirta, T. Peltonen, and V. Välimäki, "Estimation of Modal Decay Parameters from Noisy Response Measurements", presented at the AES 110th Convention, Amsterdam, The Netherlands, 2001 May 12-15, preprint 5290 (12), describes methods for modelling modal parameters. This publication does not present any methods for eliminating or equalizing these modes in audio systems.

Embodiments of the present invention differ from the prior art at least in that a discrete time description of the modes is created and with this information digital filter coefficients are formed.

Modal equalization can specifically address problematic modal resonances, decreasing their Q-value and bringing the decay rate in line with other frequencies.

Modal equalization also decreases the gain of modal resonances thereby affecting an amount of magnitude equalization. It is important to note that traditional magnitude equalization does not achieve modal equalization as a byproduct. There is no guarantee that zeros in a traditional equalizer transfer function are placed correctly to achieve control of modal resonance decay time. In fact, this is rather improbable. A sensible aim for modal equalization is not to achieve either zero decay time or flat magnitude response. Modal equalization can be a good companion of traditional magnitude equalization. A modal equalizer can take care of differences in the reverberation time while a traditional equalizer can then decrease frequency response deviations to achieve acceptable flatness of magnitude response.

Modal equalization is a method to control reverberation in a room when conventional passive means are not possible, do not exist or would present a prohibitively high cost. Modal equalization is an interesting design option particularly for low-frequency room reverberation control.

In the following, the invention will be described in more detail with reference to the exemplifying embodiments illustrated in the attached drawings in which FIG. 1*a* shows a block diagram of type I modal equalizer in accordance with the invention using the primary sound source.

FIG. 1*b* shows a block diagram of type II modal equalizer in accordance with the invention using a secondary radiator.

Figure 14A:
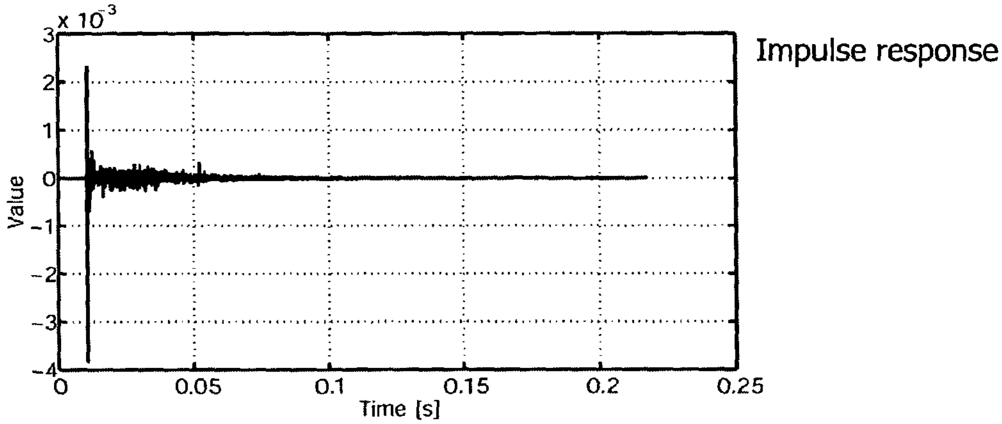

FIG. 14*a* shows an impulse response of a real room.

Figure 14B:
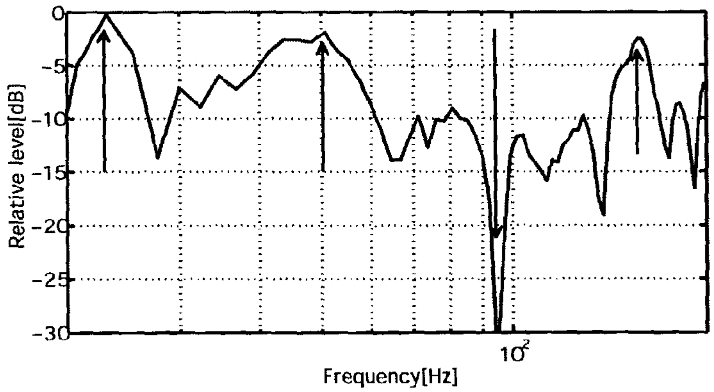

FIG. 14*b* shows a frequency response of the same room as FIG. 14*a*.

Figure 14C:
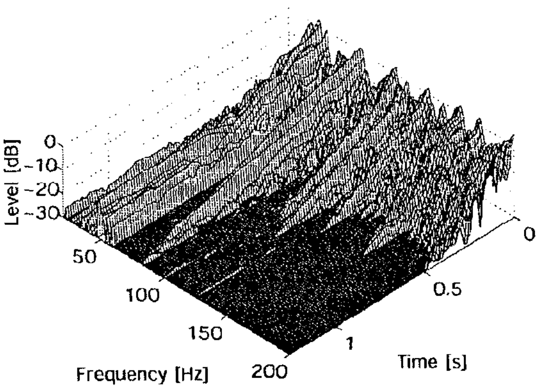

FIG. 14*c* shows a three dimensional graph of case III, real room 1 in accordance with FIGS. 14*a* and *b*, original measurement.

Figure 15:
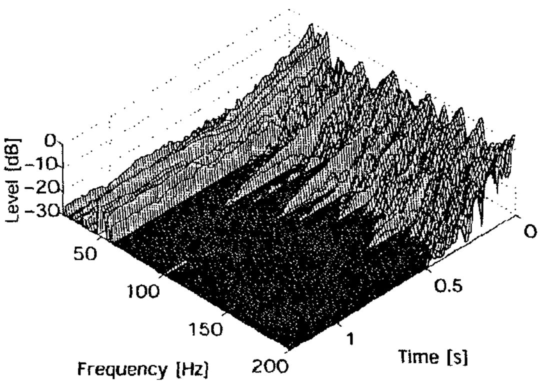

FIG. 15 shows as a three dimensional graph of case III, mode-equalized room 1 measurement.

Figure 16:
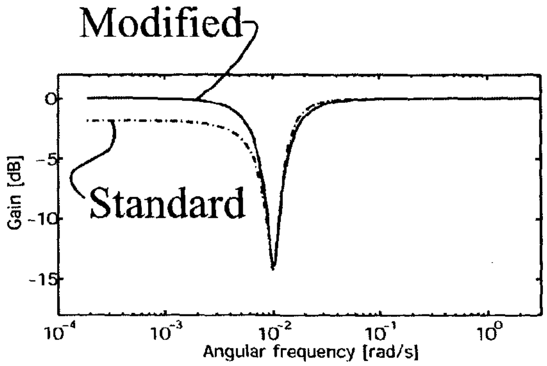

FIG. 16 shows as a graph a modified Type I modal equalizer in accordance with the invention with symmetrical gain having zero radius r=0.999 at angular frequency ω=0.01 rad/s and pole radius r=0.995 at ω=0.0087 rad/s (solid), and a standard Type I modal equalizer having both a pole and zero at ω=0.01 rad/s (dash-dot).

A loudspeaker installed in a room acts as a coupled system where the room properties typically dominate the rate of energy decay. At high frequencies, typically above a few hundred Hertz, passive methods of controlling the rate and properties of this energy decay are straightforward and well established. Individual strong reflections are broken up by diffusing elements in the room or trapped in absorbers. The resulting energy decay is controlled to a desired level by introducing the necessary amount of absorbance in the acoustical space. This is generally feasible as long as the wavelength of sound is small compared to dimensions of the space.

As we move toward low frequencies, passive means of controlling reverberant decay time become more difficult because the physical size of necessary absorbers increases and may become prohibitively large compared to the volume of the space, or absorbers have to be made narrow-band. Related to this, the cost of passive control of reverberant decay greatly increases at low frequencies. Methods for optimizing the response at a listening position by finding suitable locations for loudspeakers have been proposed [1] but cannot fully solve the problem. Because of these reasons there has been an increasing interest in active methods of sound field control at low frequencies, where active control becomes feasible as the wavelengths become long and the sound field develops less diffuse [2-6].

Modal resonances in a room can be audible because they modify the magnitude response of the primary sound or, when the primary sound ends, because they are no longer masked by the primary sound [7,8]. Detection of a modal resonance appears to be very dependent on the signal content. Olive et al. report that low-Q resonances are more readily audible with continuous signals containing a broad frequency spectrum while high-Q resonances become more audible with transient discontinuous signals [8].

Olive et al. report detection thresholds for resonances both for continuous broadband sound and transient discontinuous sound. At low Q values antiresonances (notches) are as audible as resonances. As the Q value becomes high, audibility of antiresonances reduces dramatically for wideband continuous signals [8]. Detectability of resonances reduces approximately 3 dB for each doubling of the Q value [7,8] and low Q resonances are more readily heard with zero or minimal time delay relative to the direct sound [7]. Duration of the reverberant decay in itself appears an unreliable indicator of the audibility of the resonance [7] as audibility seems to be more determined by frequency domain characteristics of the resonance.

In this patent application we present methods to actively control low-frequency reverberation. We will first present the concept and two basic types of modal equalization. A target for modal decay time versus frequency will be discussed based on existing recommendations for high quality audio monitoring rooms. Methods to identify and parametrize modes in an impulse response are introduced. Modal equalizer design for an individual mode is discussed with examples. Several case studies of both synthetic modes and modes of real rooms are presented. Finally, synthesis of IIR modal equalizer filters is discussed.

The Concept of Modal Equalization

The embodiments of the invention is especially advantageous for frequencies below 200 Hz and environments where sound wavelength relative to dimensions of a room is not very small. A global control in a room is not of main interest, but reasonable correction at the primary listening position.

These limitations lead into a problem formulation where the modal behaviour of the listening space can be modeled by a distinct number of modes such that they can be individually controlled. Each mode is modeled by an exponential decay function $$h_m(t)=A_m e^{-\tau_m t}\sin(\omega_m t+\phi_m) \quad (1)$$

Here $A_m$ is the initial envelope amplitude of the decaying sinusoid, $\tau_m$ is a coefficient that denotes the decay rate, $\omega_m$ is the angular frequency of the mode, and $\phi_m$ is the initial phase of the oscillation.

We define modal equalization as a process that can modify the rate of a modal decay. The concept of modal decay can be viewed as a case of parametric equalization, operating individually on selected modes in a room. A modal resonance is represented in the z-domain transfer function as a pole pair with pole radius r and pole angle θ

$$H_m(z)=\frac{1}{(1-re^{j\theta}z^{-1})(1-re^{-j\theta}z^{-1})} \quad (2)$$

The closer a pole pair is to the unit circle the longer is the decay time of a mode. To shorten the decay time the Q-value of a resonance needs to be decreased by shifting poles toward the origin. We refer to this process of shifting pole locations as modal equalization.

Modal decay time modification can be implemented in several ways—either the sound going into a room through the primary radiator is modified or additional sound is introduced in the room with one or more secondary radiators to interact with the primary sound. The first method has the advantage that the transfer function from a sound source to a listening position does not affect modal equalization. In the second case differing locations of primary and secondary radiators lead to different transfer functions to the listening position, and this must be considered when calculating a corrective filter. We will now discuss these two cases in more detail, drawing some conclusions on necessary conditions for control in both cases.

Type I Modal Equalization

Figure 1A:
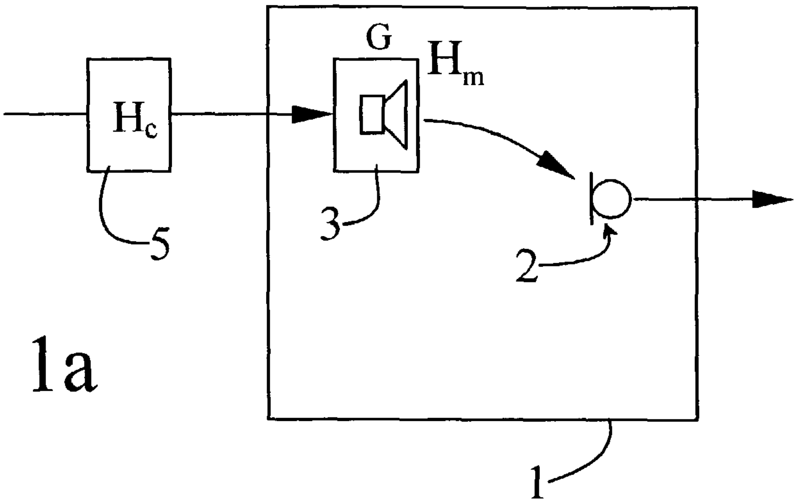

In accordance with FIG. 1*a* in one typical implementation of an embodiment of the invention, the system comprises a listening room 1, which is rather small in relation to the wavelengths to be modified. Typically the room 1 is a monitoring room close to a recording studio. Typical dimensions for this kind of a room are 6×6×3 $m^3$ (width×length×height). In other words this embodiment of the present invention is most suitable for small rooms and may not be very effective in churches and concert halls. The aim of this embodiment of the invention is to design an equalizer 5 for compensating resonance modes in vicinity of a predefined listening position 2.

Type I implementation modifies the audio signal fed into the primary loudspeaker 3 to compensate for room modes. The total transfer function from the primary radiator to the listening position represented in z-domain is $$H(z)=G(z)H_m(z) \quad (3)$$

where G(z) is the transfer function of the primary radiator from the electrical input to acoustical output and $H_m(z)=B(z)/A(z)$ is the transfer function of the path from the primary radiator to the listening position. The primary radiator has essentially flat magnitude response and small delay in our frequency band of interest, or the primary radiator can be equalized by conventional means and can therefore be neglected in the following discussion, $$G(z)=1 \quad (4)$$

We now design a pole-zero filter $H_c(z)$ having zero pairs at the identified pole locations of the modal resonances in $H_m(z)$. This cancels out existing room 1 response pole pairs in A(z) replacing them with new pole pairs A'(z) producing the desired decay time in the modified transfer function $H'_m(z)$ $$H'_m(z)=H_c(z)H_m(z)=\frac{A(z)}{A'(z)}\frac{B(z)}{A(z)}=\frac{B(z)}{A'(z)} \quad (5)$$

This leads to a correcting filter $$H_c(z)=\frac{A(z)}{A'(z)} \quad (6)$$

The new pole pair A'(z) is chosen on the same resonant frequency but closer to the origin, thereby effecting a resonance with a decreased Q value. In this way the modal resonance poles have been moved toward the origin, and the Q value of the mode has been decreased. The sensitivity of this approach will be discussed later with example designs.

Type II Modal Equalization

Figure 1B:
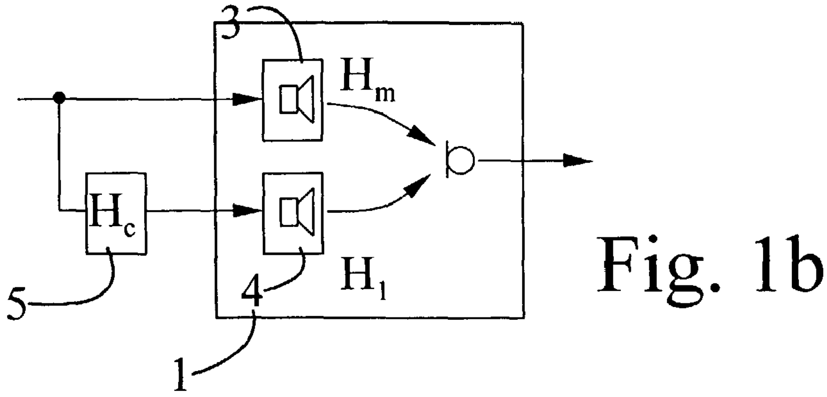
Figure 2:
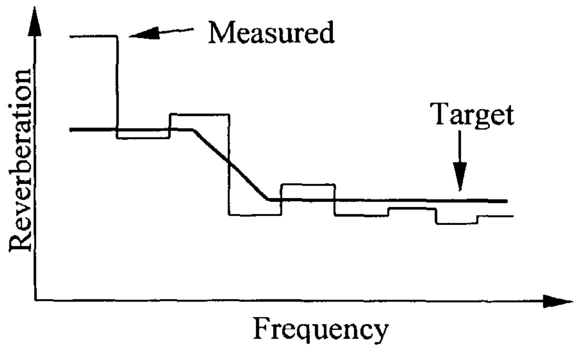
FIG. 2 shows a graph of reverberation time target and measured octave band reverberation time.

In accordance with FIG. 1*b*, type II method uses a secondary loudspeaker 4 at appropriate position in the room 1 to radiate sound that interacts with the sound field produced by the primary speakers 3. Both speakers 1 and 4 are assumed to be similar in the following treatment, but this is not required for practical implementations. The transfer function for the primary radiator 3 is $H_m(z)$ and for the secondary radiator 4 $H_1(z)$. The acoustical summation in the room produces a modified frequency response $H'_m(z)$ with the desired decay characteristics $$H'_m(z) = \frac{B(z)}{A'(z)} = H_m(z) + H_c H_1(z) \tag{7}$$

This leads to a correcting filter $H_c(z)$ where $H_m(z)$ and $H'_m(z)$ differ by modified pole radii $$H_c(z) = \frac{H'_m(z) - H_m(z)}{H_1(z)} = \frac{A_1(z)}{B_1(z)}\frac{B(z)}{A(z)}\frac{A(z)-A'(z)}{A'(z)} \text{ and} \tag{8}$$

$$H_1(z) = \frac{B_1(z)}{A_1(z)} \tag{9}$$

Note that if the primary and secondary radiators are the same source, Equation 8 reduces into a parallel formulation of a cascaded correction filter equivalent to the Type I method presented above $$H'_m(z)=H_m(z)(1+H_c(z)) \tag{10}$$

A necessary but not sufficient condition for a solution to exist is that the secondary radiator can produce sound level at the listening location in frequencies where the primary radiator can, within the frequency band of interest $$|H_1(f)|\neq 0, \text{ for } |H_m(f)|\neq 0 \tag{11}$$

At low frequencies where the size of a radiator becomes small relative to the wavelength it is possible for a radiator to be located such that there is a frequency where the radiator does not couple well into the room. At such frequencies the condition of Equation 11 may not be fulfilled, and a secondary radiator placed in such location will not be able to affect modal equalization at that frequency. Because of this it may be advantageous to have multiple secondary radiators in the room. In the case of multiple secondary radiators, Equation 7 is modified into form $$H'_m(z) = H_m(z) + \sum_N H_{c,n}(z) H_{1,n}(z) \tag{12}$$

where N is the number of secondary radiators.

After the decay times of individual modes have been equalized in this way, the magnitude response of the resulting system may be corrected to achieve flat overall response. This correction can be implemented with any of the magnitude response equalization methods.

In this patent application we will discuss identification and parametrization of modes and review some case examples of applying the proposed modal equalization to various synthetic and real rooms, mainly using the first modal equalization method proposed above. The use of one or more secondary radiators will be left to future study.

Target of Modal Equalization

The in-situ impulse response at the primary listening position is measured using any standard technique. The process of modal equalization starts with the estimation of octave band reverberation times between 31.5 Hz-4 kHz. The mean reverberation time at mid frequencies (500 Hz-2 kHz) and the rise in reverberation time is used as the basis for determining the target for maximum low-frequency reverberation time.

The target allows the reverberation time to increase at low frequencies. Current recommendations [9-11] give a requirement for average reverberation time $T_m$ in seconds for mid frequencies (200 Hz to 4 kHz) that depends on the volume V of the room $$T_m = 0.25\left(\frac{V}{V_o}\right)^{\frac{1}{3}} \tag{13}$$

where the reference room volume $V_o$ of 100 $m^3$ yields a reverberation time of 0.25 s. Below 200 Hz the reverberation time may linearly increase by 0.3 s as the frequency decreases to 63 Hz. Also a maximum relative increase of 25% between adjacent ⅓-octave bands as the frequency decreases has been suggested [10,11]. Below 63 Hz there is no requirement. This is motivated by the goal to achieve natural sounding environment for monitoring [11]. An increase in reverberation time at low frequencies is typical particularly in rooms where passive control of reverberation time by absorption is compromised, and these rooms are likely to have isolated modes with long decay times.

We can define the target decay time relative for example to the mean $T_{60}$ in mid-frequencies (500 Hz-2 kHz), increasing (on a log frequency scale) linearly by 0.2 s as the frequency decreases from 300 Hz down to 50 Hz.

Mode Identification and Parameter Estimation

After setting the reverberation time target, transfer function of the room to the listening position is estimated using Fourier transform techniques. Potential modes are identified in the frequency response by assuming that modes produce an increase in gain at the modal resonance. The frequencies within the chosen frequency range (f<200 Hz) where level exceeds the average mid-frequencies level (500 Hz to 2 kHz) are considered as potential mode frequencies.

The short-term Fourier transform presentation of the transfer function is employed in estimating modal parameters from frequency response data. The decay rate for each detected potential room mode is calculated using nonlinear fitting of an exponential decay+noise model into the time series data formed by a particular short-term Fourier transform frequency bin. A modal decay is modeled by an exponentially decaying sinusoid (Equation 1 reproduced here for convenience)

$$h_m(t)=A_m e^{-\tau_m t}\sin(\omega_m t+\phi_m) \tag{14}$$

where $A_m$ is the initial envelope amplitude of the decaying sinusoid, $\tau_m$ is a coefficient defining the decay rate, $\omega_m$ is the angular frequency of the mode, and $\phi_m$ is the initial phase of modal oscillation. We assume that this decay is in practical measurements corrupted by an amount of noise $n_b(t)$ $$n_b(t)=A_n n(t) \tag{15}$$

and that this noise is uncorrelated with the decay. Statistically the decay envelope of this system is $$a(t) = \sqrt{A_m^2 e^{-2\tau t} + A_n^2} \tag{16}$$

The optimal values $A_n$, $\tau_m$ and $A_m$ are found by least-squares fitting this model to the measured time series of values obtained with a short-term Fourier transform measurement. The method of nonlinear modeling is detailed in [12]. Sufficient dynamic range of measurement is required to allow reliable detection of room mode parameters although the least-squares fitting method has been shown to be rather resilient to high noise levels. Noise level estimates with the least-squares fitting method across the frequency range provide a measurement of frequency-dependent noise level A(f) and this information is later used to check data validity.

Modal Parameters

The estimated decay parameters $\tau_m$(f) across the frequency range are used in identifying modes exceeding the target criterion and in calculating modal equalizing filters. It can be shown that the spectral peak of a Gaussian-windowed stationary sinusoid calculated using Fourier transform has the form of a parabolic function [13]. Therefore the precise center frequency of a mode is calculated by fitting a second-order parabolic function into three Fourier transform bin values around the local maximum indicated by decay parameters $\tau_m$(f) in the short-term Fourier transform data $$G(f)=af^2+bf+c \tag{17}$$

The frequency where the second-order function derivative assumes value zero is taken as the center frequency of the mode $$\frac{\partial G(f)}{\partial f}=0 \Rightarrow f=-\frac{b}{2a} \tag{18}$$

In this way it is possible to determine modal frequencies more precisely than the frequency bin spacing of the Fourier transform presentation would allow.

Estimation of modal pole radius can be based on two parameters, the Q-value of the steady-state resonance or the actual measurement of the decay time $T_{60}$. While the Q-value can be estimated for isolated modes it may be difficult or impossible to define a Q-value for modes closely spaced in frequency. On the other hand the decay time is the parameter we try to control. Because of these reasons we are using the decay time to estimate the pole location.

The 60-dB decay time $T_{60}$ of a mode is related to the decay time constant $\tau$ by $$T_{60}=-\frac{1}{\tau}\ln(10^{-3})\approx\frac{6.908}{\tau} \tag{19}$$

The modal parameter estimation method employed in this work [12] provides us an estimate of the time constant $\tau$. This enables us to calculate $T_{60}$ to obtain a representation of the decay time in a form more readily related to the concept of reverberation time.

Discrete-Time Representation of a Mode

Consider now a second-order all-pole transfer function having pole radius r and pole angle $\theta$ $$H(z)=\frac{1}{(1-re^{j\theta}z^{-1})(1-re^{-j\theta}z^{-1})}=\frac{1}{1-2r\cos\theta z^{-1}+r^2z^{-2}} \tag{20}$$

Taking the inverse z-transform yields the impulse response of this system as $$h(n)=\frac{r^n\sin(\theta(n+1))}{\sin\theta}u(n) \tag{21}$$

where u(n) is a unit step function.

The envelope of this sequence is determined by the term $r^n$. To obtain a matching decay rate to achieve $T_{60}$ we require that the decay of 60 dB is accomplished in $N_{60}$ steps given a sample rate $f_s$, $$20\log(r^{N_{60}})=-60,\ N_{60}=T_{60}f_s \tag{22}$$

We can now solve for the pole radius r $$r=10^{\frac{-3}{T_{60}f_s}} \tag{23}$$

Using the same approach we can also determine the desired pole location, by selecting the same frequency but a modified decay time $T_{60}$ and hence a new radius for the pole. Some error checking of the identified modes is necessary in order to discard obvious measurement artifacts. A potential mode is rejected if the estimated noise level at that modal frequency is too high, implying insufficient signal-to-noise ratio for reliable measurement. Also, candidate modes that show unrealistically slow decay or no decay at all are rejected because they usually represent technical problems in the measurement such as mains hum, ventilation noise or other unrelated stationary error signals, and not true modal resonances.

Modal Equalizer Design

For sake of simplicity the design of Type I modal equalizer is presented here. This is the case where a single radiator is reproducing both the primary sound and necessary compensation for the modal behavior of a room. Another way of viewing this would be to say that the primary sound is modified such that target modes decay faster.

A pole pair z=F(r,$\theta$) models a resonance in the z-domain based on measured short-term Fourier transform data while the desired resonance Q-value is produced by a modified pole pair $z_c$=F($r_c$,$\theta_c$). The correction filter for an individual mode presented in Equation 5 becomes $$H_c(z)=\frac{A(z)}{A'(z)} \tag{22}$$

$$=\frac{(1-re^{j\theta}z^{-1})(1-re^{-j\theta}z^{-1})}{(1-r^{cej}{}_cz^{-1})(1-r_ce^{-j\theta_c}z^{-1})} \tag{24}$$

Figure 4:
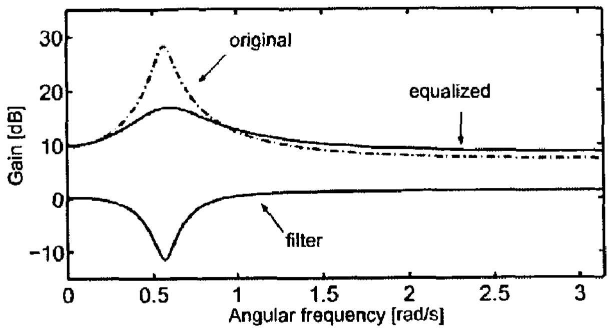
FIG. 4 shows a graph of effect of mode pole relocation on the example system and the magnitude response of modal equalizer filter in accordance with the invention.
Figure 5:
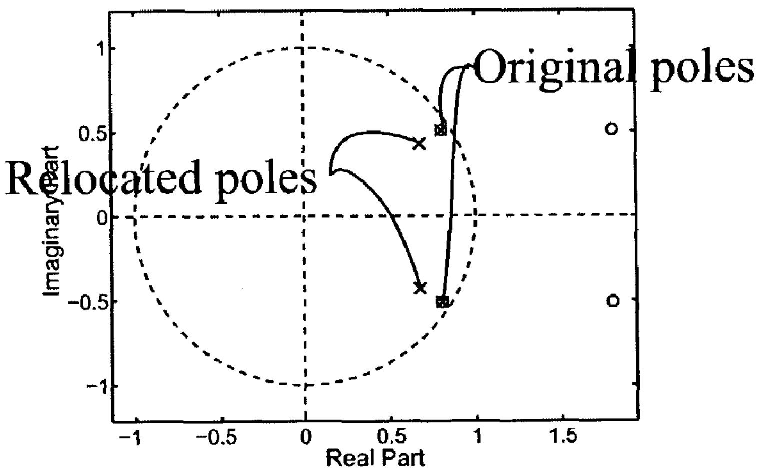
FIG. 5 shows a graph of poles (mark x) and zeros (mark o) of the mode-equalized system in accordance with the invention.
Figure 6:
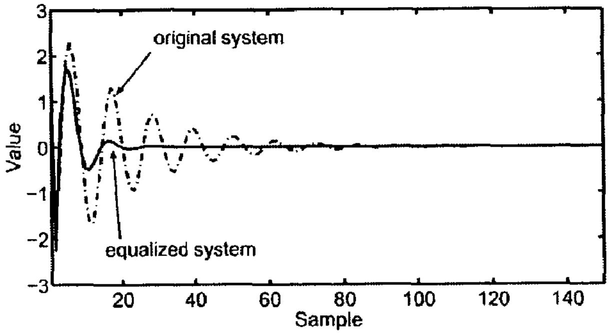
FIG. 6 shows a graph of impulse responses of original and mode-equalized system in accordance with the invention.
Figure 7:
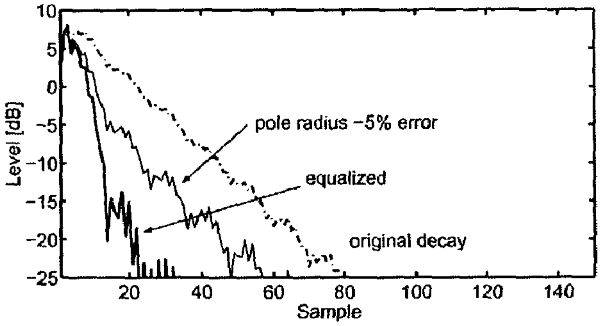
FIG. 7 shows a graph of original and corrected Hilbert decay envelope with exact and erroneous mode pole radius.

To give an example of the correction filter function, consider a system defined by a pole pair (at radius r=0.95, angular frequency $\omega=\pm0.18\pi$) and a zero pair (at r=1.9, $\omega=\pm0.09\pi$). We want to shift the location of the poles to radius r=0.8. To effect this we use the Type I filter of Equation 24 with the given pole locations, having a notch-type magnitude response (FIG. 4). This is because numerator gain of the correction filter is larger than denominator gain. As a result, poles at radius r=0.95 have been cancelled and new poles have been created at the desired radius (FIG. 5). Impulse responses of the two systems (FIG. 6) verify the reduction in modal resonance Q value. The decay envelope of the impulse response (FIG. 7) now shows a rapid initial decay.

Figure 8:
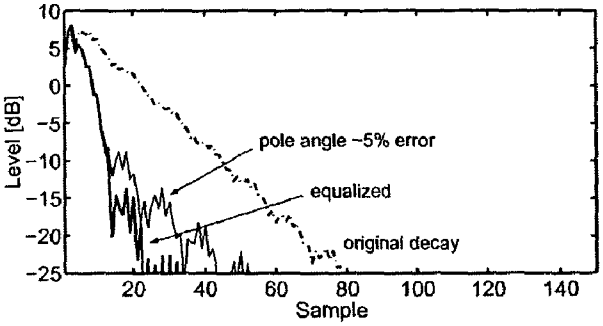
FIG. 8 shows a three dimensional graph of original and corrected Hilbert decay envelope with exact and erroneous mode pole angle.
Figure 9:
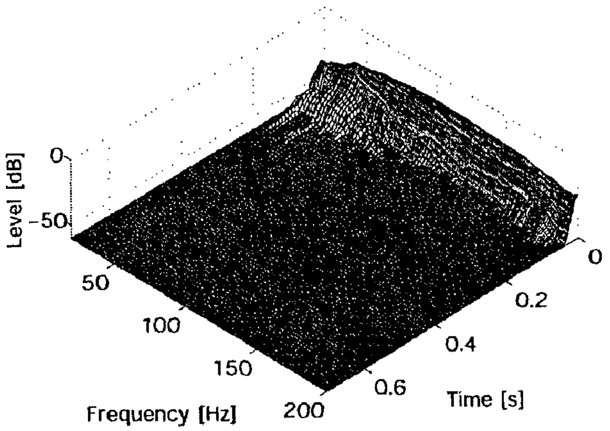
FIG. 9 shows an anechoic waterfall plot of a two-way loudspeaker response used in case examples I and II in accordance with the invention.

The quality of a modal pole location estimate determines the success of modal equalization. The estimated center frequency determines the pole angle while the decay rate determines the pole distance from the origin. Error in these estimates will displace the compensating zero and reduce the accuracy of control. For example, an estimation error of 5% in the modal pole radius (FIG. 7) or pole angle (FIG. 8) greatly reduces control, demonstrating that precise estimation of correct pole locations is paramount to success of modal equalization.

Figure 3:
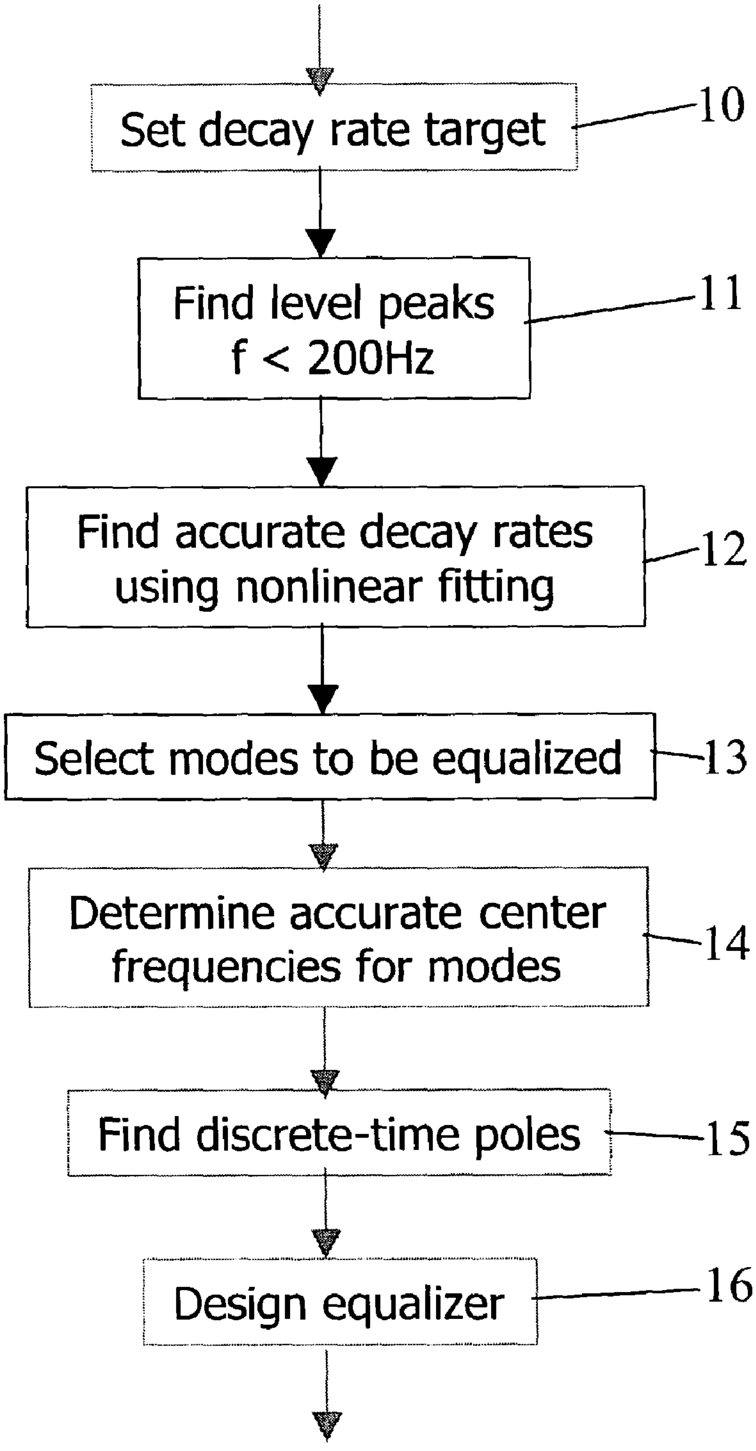
FIG. 3 shows a flow chart of one design process in accordance with the invention.

The before specified method is described as a flow chart in FIG. 3.

In step 10 the decay rate target is set. In this step normal decay rate is defined and as a consequence an upper limit for this rate is defined.

In step 11 peaks or notches are defined for the specific room 1 and especially for a predefined listening position 2.

In step 12 accurate decay rates for each peak and notch exceeding the set limit are defined by nonlinear fitting.

The modes to be equalized are selected in step 13.

In step 14 accurate center frequencies for the modes are defined.

In step 15 a discrete-time description of the modes is formed and consequently the discrete-time poles are defined and in step 16 an equalizer is designed on the basis of this information.

Case Studies

Case studies in this section demonstrate the modal equalization process. These cases contain artificially added modes and responses of real rooms equalized with the proposed method.

The waterfall plots in FIGS. 9-15 have been computed using a sliding rectangular time window of length 1 second. The purpose is to maximize spectral resolution. The problem of using a long time window is the lack of temporal resolution. Particularly, the long time window causes an amount of temporal integration, and noise in impulse response measurements affects level estimates. This effectively produces a cumulative decay spectrum estimate [15], also resembling Schroeder backward integration [16].

Cases I and II use an impulse response of a two-way loudspeaker measured in an anechoic room. The waterfall plot of the anechoic impulse response of the loudspeaker (FIG. 9) reveals short reverberant decay at low frequencies where the absorption is no longer sufficient to fulfill free field conditions. Dynamic range of the waterfall plots of cases I and II is 60 dB, allowing direct inspection of the decay time. Case III is based on impulse response measured in a real room.

Cases with Artificial Modes

Figure 10:
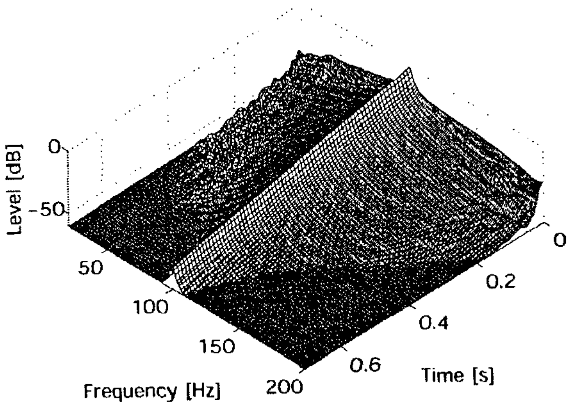
FIG. 10 shows a three dimensional graph of case I, free field response of a compact two-way loudspeaker with an added artificial room mode at f=100 Hz.
Figure 11:
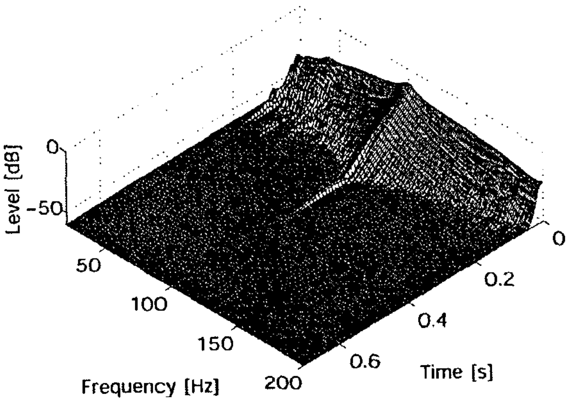
FIG. 11 shows a three dimensional graph of case I, mode-equalized artificial room mode at f=100 Hz.
Figure 12:
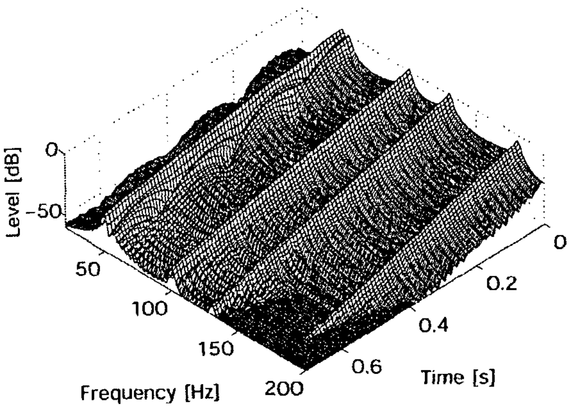
FIG. 12 shows a three dimensional graph of case II, five artificial modes added to an impulse response of a compact two-way loudspeaker anechoic response.

Case 1 attempts to demonstrate the effect of the developed mode equalizer calculation algorithm. It is based on the free field response of a compact two-way loudspeaker measured in an anechoic room. An artificial mode with $T_{60}$=1 second has been added to the data at f=100 Hz and an equalizer has been designed to shorten the $T_{60}$ to 0.26 seconds. The room mode increases the level at the resonant frequency considerably (about 30 dB) and the long decay rate is evident (FIG. 10). After equalization the level is still higher (about 15 dB) than the base line level but the decay now starts at a lower level and has shortened to the desired level of 0.26 s (FIG. 11).

Figure 13:
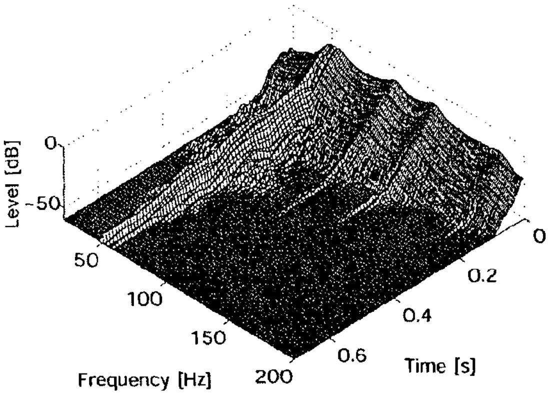
FIG. 13 shows a three dimensional graph of case II, mode-equalized five-mode case.

Case II uses the same anechoic two-way loudspeaker measurement. In this case five artificial modes with slightly differing decay times have been added. See Table I for original and target decay times and center frequencies of added modes. For real room responses, the target decay time is determined by mean $T_{60}$ in mid-frequencies, increasing linearly (on linear frequency scale) by 0.2 s as the frequency decreases from 300 Hz down to 50 Hz. For the synthetic Case II the target decay time was arbitrarily chosen as 0.2 seconds. Again we note that the magnitude gain of modal resonances (FIG. 12) is decreased by modal equalization (FIG. 13). The target decay times have been achieved except for the two lowest frequency modes (50 Hz and 55 Hz). There is an initial fast decay, followed by a slow low-level decay. This is because the center frequencies and decay rates were not precisely identified, and the errors cause the control of the modal behaviour to deteriorate.

Table 1. Case II artificial modes center frequency f, decay time $T_{60}$, and target decay time $T'_{60}$.

TABLE 1

Case II artificial modes center frequency f, decay time $T_{60}$, and target decay time $T'_{60}$.

| mode no | f [Hz] | $T_{60}$ [s] | $T'_{60}$ [s] |
|---|---|---|---|
| 1 | 50 | 1.4 | 0.30 |
| 2 | 55 | 0.8 | 0.30 |
| 3 | 100 | 1.0 | 0.26 |
| 4 | 130 | 0.8 | 0.24 |
| 5 | 180 | 0.7 | 0.20 |

Cases with Real Room Responses

Case III is a real room response. It is a measurement in a hard-walled approximately rectangular meeting room with about 50 $m^2$ floor area. The target decay time specification is the same as in Case II.

In Case III the mean $T_{60}$ in mid frequencies is 0.75 s. 20 modes were identified with decay time longer than the target decay time. The mode frequency $f_m$, estimated decay time $T_{60}$ and target decay time $T'_{60}$ are given in Table 2.

FIG. 14*a* shows an impulse response of an example room.

FIG. 14*b* shows a frequency response of the same room. In figure arrows pointing upwards show the peaks in the response and the only arrow downwards shows a notch (anti-resonance).

The waterfall plot of the original impulse response of FIG. 14*c* and the modally equalized impulse response of FIG. 15 show some reduction of modal decay time. A modal decay at 78 Hz has reduced significantly from the original 2.12 s. The fairly constant-level signals around 50 Hz are noise components in the measurement file. Also the decay rate at high mode frequencies is only modestly decreased because of imprecision in estimating modal parameters. On the other hand, the decay time target criterion relaxes toward low frequencies, demanding less change in the decay time.

Table 2. Case III, equalized mode frequency $f_m$, original $T_{60}$ and target decay rate $T'_{60}$.

TABLE 2

Case III, equalized mode frequency $f_m$, original $T_{60}$ and target decay rate $T'_{60}$.

| $f_m$ [Hz] | $T_{60}$ [s] | $T'_{60}$ [s] |
|---|---|---|
| 44 | 2.35 | 0.95 |
| 60 | 1.38 | 0.94 |
| 64 | 1.57 | 0.94 |
| 66 | 1.66 | 0.94 |
| 72 | 1.51 | 0.93 |
| 78 | 2.12 | 0.93 |
| 82 | 1.32 | 0.92 |

TABLE 2-continued

Case III, equalized mode frequency $f_m$, original $T_{60}$ and target decay rate $T'_{60}$.

| $f_m$ [Hz] | $T_{60}$ [s] | $T'_{60}$ [s] |
|---|---|---|
| 106 | 1.31 | 0.90 |
| 109 | 1.40 | 0.90 |
| 116 | 1.57 | 0.90 |
| 120 | 1.32 | 0.89 |
| 123 | 1.15 | 0.89 |
| 128 | 1.06 | 0.89 |
| 132 | 1.17 | 0.88 |
| 142 | 0.96 | 0.88 |
| 155 | 1.06 | 0.87 |
| 161 | 1.08 | 0.86 |
| 165 | 1.24 | 0.86 |
| 171 | 0.88 | 0.85 |
| 187 | 0.89 | 0.84 |

Implementation of Modal Equalizers

Type I Filter Implementation

To correct N modes with a Type I modal equalizer, we need an order-2N IIR transfer function. The most immediate method is to optimize a second-order filter, defined by Equation 24, for each mode identified. The final order-2N filter is then formed as a cascade of these second-order subfilters $$H_c(z)=H_{c,1}(z)\cdot H_{c,2}(z)\cdot \ldots \cdot H_{c,N}(z) \quad (26)$$

Another formulation allowing design for individual modes is served by the formulation in Equation 10. This leads naturally into a parallel structure where the total filter is implemented as $$H_c(z) = 1 + \sum_N H_{c,k}(z) \quad (27)$$

Asymmetry in Type I Equalizers

At low angular frequencies the maximum gain of a resonant system may no longer coincide with the pole angle [14]. Similar effects also happen with modal equalizers, and must be compensated for in the design of an equalizer.

Basic Type I modal equalizer (see Equation 24) becomes increasingly unsymmetrical as angular frequency approaches $\omega=0$. A case example in FIG. 16 shows a standard design with pole and zero at $\omega_{p,z}=0.01$ rad/s, zero radius $r_z=0.999$ and pole radius $r_p=0.995$. There is a significant gain change for frequencies below the resonant frequency. This asymmetry may cause a problematic cumulative change in gain when a modal equalizer is constructed along the principles in Equations 26 and 27.

It is possible to avoid asymmetry by decreasing the sampling frequency in order to bring the modal resonances higher on the discrete frequency scale.

If sample rate alteration is not possible, we can symmetrize a modal equalizer by moving the pole slightly downwards in frequency (FIG. 16). Doing so, the resulting modal frequency will shift slightly because of modified pole frequency, and the maximal attenuation of the system may also change. These effects have to be accounted for in symmetrizing a modal equalizer at low frequencies. This can be handled by an iterative fitting procedure with a target to achieve desired modal decay time simultaneously with a symmetrical response.

Type II Filter Implementation

Type II modal equalizer requires a solution of Equation 8 for each secondary radiator. The correcting filter $H_c(z)$ can be implemented by direct application of Equation 8 as a difference of two transfer functions convolved by the inverse of the secondary radiator transfer function, bearing in mind the requirement of Equation 11. A more optimized implementation can be found by calculating the correcting filter transfer function $H_c(z)$ based on measurements, and then fitting an FIR or IIR filter to approximate this transfer function. This filter can then be used as the correcting filter. Any filter design technique can be used to design this filter.

In the case of multiple secondary radiators the solution becomes slightly more convoluted as the contribution of all secondary radiators must be considered. For example, solution of Equation 12 for the correction filter of the first secondary radiator is $$H_{c,1}(z) = \frac{H_m(z) - H_m(z) - \sum_{n=2}^{N} H_{c,n}(z)H_{1,n}(z)}{H_{1,1}(z)} \quad (28)$$

It is evident that all secondary radiators interact to form the correction. Therefore the design process of these secondary filters becomes a multidimensional optimization task where all correction filters must be optimized together. A suboptimal solution is to optimize for one secondary source at a time, such that the subsequent secondary sources will only handle those frequencies not controllable by the previous secondary sources for instance because of poor radiator location in the room.

We have presented two different types of modal equalization approaches, Type I modifying the sound input into the room using the primary speakers, and Type II using separate speakers to input the mode compensating sound into a room. Type I systems are typically minimum phase. Type II systems, because the secondary radiator is separate from the primary radiator, may have an excess phase component because of differing times-of-flight. As long as this is compensated in the modal equalizer for the listening location, Type II systems also conform closely to the minimum phase requirement.

There are several reasons why modal equalization is particularly interesting at low frequencies. At low frequencies passive means to control decay rate by room absorption may become prohibitively expensive or fail because of constructional faults. Also, modal equalization becomes technically feasible at low frequencies where the wavelength of sound becomes large relative to room size and to objects in the room, and the sound field is no longer diffuse. Local control of the sound field at the main listening position becomes progressively easier under these conditions.

Recommendations [9-11] suggest that it is desirable to have approximately equal reverberant decay rate over the audio range of frequencies with possibly a modest increase toward low frequencies. We have used this as the starting point to define a target for modal equalization, allowing the reverberation time to increase by 0.2 s as the frequency decreases from 300 Hz to 50 Hz. This target may serve as a starting point, but further study is needed to determine a psychoacoustically proven decay rate target.

In this patent the principle of modal equalization application is introduced, with formulations for Type I and Type II correction filters. Type I system implements modal equalization by a filter in series with the main sound source, i.e. by modifying the sound input into the room. Type II system does not modify the primary sound, but implements modal equalization by one or more secondary sources in the room, requiring a correction filter for each secondary source. Methods for identifying and modeling modes in an impulse response measurement were presented and precision requirements for modeling and implementation of system transfer function poles were discussed. Several examples of mode equalizers were given of both simulated and real rooms. Finally, implementations of the mode equalizer filter for both Type I and Type II systems were described.

REFERENCES

1. A. G. Groh, "High-Fidelity Sound System Equalization by Analysis of Standing Waves", *J. Audio Eng. Soc.*, vol. 22, no. 10, pp. 795-799 (October 1974).
2. S. J. Elliott and P. A. Nelson, "Multiple-Point Equalization in a Room Using Adaptive Digital Filters", *J. Audio Eng. Soc.*, vol. 37, no. 11, pp. 899-907 (November 1989).
3. S. J. Elliott, L. P. Bhatia, F. S. Deghan, A. H. Fu, M. S. Stewart, and D. W. Wilson, "Practical Implementation of Low-Frequency Equalization Using Adaptive Digital Filters", *J. Audio Eng. Soc.*, vol. 42, no. 12, pp. 988-998 (December 1994).
4. J. Mourjopoulos, "Digital Equalization of Room Acoustics", presented at the AES 92th Convention, Vienna, Austria, March 1992, preprint 3288.
5. J. Mourjopoulos and M. A. Paraskevas, "Pole and Zero Modelling of Room Transfer Functions", *J. Sound and Vibration*, vol. 146, no. 2, pp. 281-302 (1991).
6. R. P. Genereux, "Adaptive Loudspeaker Systems: Correcting for the Acoustic Environment", in *Proc. AES 8th Int. Conf.,* (Washington D.C., May 1990), pp. 245-256.
7. F. E. Toole and S. E. Olive, "The Modification of Timbre by Resonances: Perception and Measurement", *J. Audio Eng. Soc.*, vol. 36, no. 3, pp. 122-141 (March 1998).
8. S. E. Olive, P. L. Schuck, J. G. Ryan, S. L. Sally, and M. E. Bonneville, "The Detection Thresholds of Resonances at Low Frequencies", *J. Audio Eng. Soc.*, vol. 45, no. 3, pp. 116-127 (March 1997).
9. ITU Recommendation ITU-R BS.1116-1, "Methods for the Assessment of Small Impairments in Audio Systems Including Multichannel Sound Systems", Geneva (1994).
10. AES Technical Committee on Multichannel and Binaural Audio Technology (TC-MBAT), "Multichannel Surround Sound Systems and Operations", Technical Document, version 1.5 (2001).
11. EBU Document Tech. 3276-1998 (second ed.), "Listening Condition for the Assessment of Sound Programme Material: Monophonic and Two-Channel Stereophonic", (1998).
12. M. Karjalainen, P. Antsalo, A. Mäkivirta, T. Peltonen, and V. Välimäki, "Estimation of Modal Decay Parameters from Noisy Response Measurements", presented at the AES 110th Convention, Amsterdam, The Netherlands, May 12-15, 2001, preprint 5290.
13. J. O. Smith and X. Serra, "PARSHL: An Analysis/Synthesis Program for Non-Harmonic Sounds Based on a Sinusoidal Representation", in *Proc. Int. Computer Music Conf.* (Urbana Ill., 1987), pp. 290-297
14. K. Steiglitz, "A Note on Constant-Gain Digital Resonators", *Computer Music Journal*, vol. 18, no. 4, pp. 8-10 (1994).
15. J. D. Bunton and R. H. Small, "Cumulative Spectra, Tone Bursts and Applications", *J. Audio Eng. Soc.*, vol. 30, no. 6, pp. 386-395 (June 1982).
16. M. R. Schroeder, "New Method of Measuring Reververation Time", *J. Acoust. Soc. Am.*, vol. 37, pp. 409-412, (1965).

The invention claimed is:

1. A method for designing a modal equalizer for low frequency sound reproduction in a predetermined space within a room and location therein, wherein the low frequency sound is within a range below 200 Hz, and wherein the room has a plurality of room modes, said method comprising:

determining the room modes, by determining corresponding rates of decay across the low frequency range;

selecting modes to be equalized based on the corresponding determined rates of decay;

determining center frequencies for each said selected modes; and defining coefficients of an infinite impulse response (IIR) modal filter based upon the corresponding rates of decay for each of the selected room modes, characterized by for each selected mode, designing a modal correction filter provided as a relation between an estimate of pole location and a desired pole location, where at least the estimated pole locations are determined from respective said rates of decay, and forming the IIR modal filter as a cascade of the modal correction filters.

2. The method in accordance with claim 1, further comprising: creating a discrete-time representation of the determined modes wherein the discreet-time description is a Z-transform.

3. The method in accordance with claim 2, wherein said defining step includes shifting the estimated pole locations associated with the filter coefficients that include decay time constant information as a parameter.

4. The method in accordance with claim 1 or 2 or 3, wherein the decay rates are defined by nonlinear fitting.

5. The method in accordance with claim 1, wherein the determined modes are attenuated utilizing the defined filter coefficients by decreasing a Q value of each determined mode by affecting actively the sound field in the room.

6. The method in accordance with claim 1, wherein the sound of at least one primary speaker is modified.

7. The method in accordance with claim 1, wherein the sound of at least one secondary speaker is modified.

8. A method for controlling reverberation in a listening room, comprising:

generating a transfer function associated with a listening position within the room;

selecting at least one mode based upon the transfer function, from among those frequencies below 200 Hz that have magnitude levels that exceed the average level of mid-frequencies;

creating a discrete time representation based upon the at least one selected mode; and generating infinite impulse response filter coefficients for each of said at least one selected mode using the discrete time representation, characterized by for each selected mode, designing a modal correction filter provided as a relation between an estimate of pole location and a desired pole location, where at least the estimated pole locations are determined from the discrete time representation, and forming the infinite impulse response filter as a cascade of the modal correction filters.

9. The method according to claim 8, wherein the generating filter coefficients is based upon controlling reverberation by modifying sound produced by a primary radiator.

10. The method according to claim 8, wherein the generating filter coefficients is based upon controlling reverberation by introducing additional sound produced by a secondary radiator.

11. A method for controlling reverberation in a listening room, comprising:

generating a transfer function associated with a listening position within the room;

selecting at least one mode for frequencies of interest based upon the transfer function;

creating a discrete time representation based upon the at least one selected mode; and generating infinite impulse response filter coefficients for each said at least one selected mode using the discrete time representation, wherein the selecting further comprises:

identifying potential modes for equalization based upon a target reverberation time;

calculating a decay rate corresponding to each of the potential modes;

comparing each decay rate with the target reverberation time to obtain the at least one selected mode; and determining a center frequency associated with a spectral peak corresponding to each selected mode;

wherein the generating the infinite impulse response filter further comprises:

for each selected mode, designing a modal correction filter provided as a relation between an estimate of pole location and a desired pole location, where at least the estimated pole locations are determined from the discrete time representation, and forming the infinite impulse response filter as a cascade of the modal correction filters.

12. The method according to claim 11, further comprising: estimating the reverberation time based upon a volume of the room.

13. The method according to claim 11, wherein the calculating the decay rate further comprises: fitting a model using non-linear least squares to measured time-series data.

14. The method according to claim 11, wherein the determining the center frequency further comprises: fitting a second-order parabolic function to spectral transform values located around the spectral peak.

15. The method according to claim 11, further comprising:

calculating a pole radius based upon the decay rate; and calculating a pole angle based upon the center frequency.

16. The method according to claim 15, wherein the creating the discreet time representation further comprises: modeling the room using a Z-transform representation based upon the pole radius and pole angle.

17. A system for controlling reverberation in a listening room having a plurality of resonant modes, each mode having a modal decay rate, comprising:

a radiator which produces sound in accordance with a signal; and an equalizer, functionally coupled to the radiator, having modal poles determined based upon decay time of the respective resonant modes of the listening room, which modifies the signal to adjust each of the modal decay rates of the listening room, wherein the equalizer includes an infinite impulse response filter designed as a cascade of modal filters for each of the modal poles.

18. The system according to claim 17, wherein the radiator is a primary radiator which produces sound in accordance with an input signal, and the equalizer modifies the input signal.

19. The system according to claim 17, wherein the radiator is a secondary radiator which produces an additional sound in accordance with a corrective signal provided by the equalizer.

* * * * *